United States Patent
Chiba et al.

(10) Patent No.: US 7,231,456 B1
(45) Date of Patent: Jun. 12, 2007

(54) 32-BIT VENDOR-EXTENDED-TYPE VENDOR SPECIFIC ATTRIBUTE

(75) Inventors: Murtaza Chiba, Fremont, CA (US); Din-I Tsai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1022 days.

(21) Appl. No.: 09/975,896

(22) Filed: Oct. 10, 2001

(51) Int. Cl.
   *G06F 15/16* (2006.01)
(52) U.S. Cl. .................. 709/236; 455/411; 713/161
(58) Field of Classification Search ............... 370/338, 370/352, 465, 252; 710/33; 380/247; 709/223, 709/236; 455/411; 713/161
See application file for complete search history.

(56) References Cited

U.S. PATENT DOCUMENTS

| | | | | |
|---|---|---|---|---|
| 6,980,523 B1* | 12/2005 | Lipford et al. | ............. | 370/252 |
| 2002/0009066 A1* | 1/2002 | Shimizu et al. | ............. | 370/338 |
| 2002/0012339 A1* | 1/2002 | Wenzel et al. | ............. | 370/352 |
| 2002/0012433 A1* | 1/2002 | Haverinen et al. | ............. | 380/247 |
| 2002/0163932 A1* | 11/2002 | Fischer et al. | ............. | 370/465 |
| 2003/0158979 A1* | 8/2003 | Tateyama et al. | ............. | 710/33 |
| 2003/0206559 A1* | 11/2003 | Trachewsky et al. | ........ | 370/509 |

OTHER PUBLICATIONS

Dommety et al, Mobile IP Vendor/Organization-Specific Extensions, RCF 3115, Apr. 2001.*
Dommety et al, "Mobile IP Vendor/Organization-Specific Extensions draft-ietf-mobileip-vendor-ext-02.txt", Nov. 1999.*

* cited by examiner

*Primary Examiner*—Jungwon Chang
(74) *Attorney, Agent, or Firm*—Sierra Patent Group, Ltd.

(57) ABSTRACT

Method and apparatus for generating and receiving an extended Vendor Specific Attribute (VSA) is disclosed. In one aspect, a extended format VSA may be generated containing at least a Vendor-Type field having a predetermined value and a Extended Vendor-Type field. A Vendor Specific Attribute packet generated and received in accordance with the teachings of this disclosure may have a field sequence of <Type> <Length> <Vendor-ID> <Vendor-Type> <Length> <Vendor-Extended-Type> <Value>, and may field lengths of Type=8 bits; Length=8 bits; Vendor-ID=32 bits; Vendor-Type 8 bits; Length=8 bits; Vendor-Extended-Type=32 bits; and Value=1 or more bytes.

9 Claims, 5 Drawing Sheets

Figure 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |            Vendor-Id          |
+-+-+-+-+-+-+-+-+-+-+-+-+-+-+-+-+-+-+-+-+-+-+-+-+-+-+-+-+-+-+-+-+
|  Vendor-Id (cont)             |  Vendor-Type  |    Length     |
+-+-+-+-+-+-+-+-+-+-+-+-+-+-+-+-+-+-+-+-+-+-+-+-+-+-+-+-+-+-+-+-+
|  Value . . .
+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |          Vendor-Id            |
+-+-+-+-+-+-+-+-+-+-+-+-+-+-+-+-+-+-+-+-+-+-+-+-+-+-+-+-+-+-+-+-+
|        Vendor-Id (cont.)      |         Vendor-Type   | Length
+-+-+-+-+-+-+-+-+-+-+-+-+-+-+-+-+-+-+-+-+-+-+-+-+-+-+-+-+-+-+-+-+
|     Vendor-Extended-Type      |
+-+-+-+-+-+-+-+-+-+-+-+-+-+-+-+-+-+-+-+-+-+-+-+-+-+-+-+-+-+-+-+-+
|F|R|R|S|M|E|T| Optional Fields based on Flag ...
+-+-+-+-+-+-+-+-+-+-+-+-+-+-+-+-+-+-+-+-+-+-+-+-+-+-+-+-+-+-+-+-+
| Value ...
+-+-+-+-+-+-+-+-+-+-+-+-+-+-+-+-+-+-+-+-+-+-+-+-+-+-+-+-+-+-+-+-+
```

32-BIT VENDOR-EXTENDED-TYPE VENDOR SPECIFIC ATTRIBUTE

BACKGROUND

1. Field of the Disclosure

The disclosure relates generally to data communications, and in particular, to a 32-bit vendor specific attribute extension to the RADIUS RFC.

2. The Prior Art

RADIUS (Remote Authentication Dial In User Service) is a standards-based protocol for AAA (Authentication, Authorization, and Accounting) and enables systems to securely determine the identity and privileges of a user and track that user's activities. As is known by those skilled in the art, RADIUS exchanges attributes between clients and servers in a Type, Length, Value (TLV) format.

FIG. 1 is a diagram of a prior art RADIUS packet 100. The packet 100 typically includes a Type field of 8 bits; a Length field of 8 bits for specifying the total length of the attribute; a Vendor-ID field of 32 bits; a Vendor-Type field of 8 bits; a second length field of 8 bits for specifying the length of the inner value; and an inner value field of 1 or more bytes.

The RADIUS protocol allows for extensions via the Vendor Specific attribute. This attribute is designated for Vendor Specific Extensions and is known as the Vendor Specific Attribute (VSA) and has a fixed outer type of 26. As is known by those of ordinary skill in the art, the RFC is an IETF document describing a standard protocol, for RADIUS it is #RFC2865. The RFC suggests that this attribute should accommodate a maximum of 255 possible Vendor-Types.

At the time of design of the protocol, 255 possible Vendor-Types was considered to be an adequate space and it was further thought that most of the attributes that are commonly needed by all Vendors would be introduced in the standard space (from 1–255 excluding Vendor Specific Type 26).

However, as the number of protocols utilized by Network Access Servers (NAS) has grown, the need for more extensions has also increased. As is known by those skilled in the art, extensions may be triggered by VSAs stored in the user profile of a given NAS. This widespread growth of the number of protocols supported by a NAS has led to the Vendor space being completely utilized.

SUMMARY

Method and apparatus for generating and receiving an extended Vendor Specific Attribute (VSA) are disclosed. In one aspect, an extended format VSA may be generated containing at least a Vendor-Type field having a predetermined value and a Extended Vendor-Type field.

A Vendor Specific Attribute packet generated and received in accordance with the teachings of this disclosure may have a field sequence of <Type> <Length> <Vendor-ID> <Vendor-Type> <Length> <Vendor-Extended-Type> <Value>.

A Vendor Specific Attribute packet generated and received in accordance with the teachings of this disclosure may have a field lengths of Type 8 bits; Length=8 bits; Vendor-ID=32 bits; Vendor-Type 8 bits; Length=8 bits; Vendor-Extended-Type=32 bits; and Value=1 or more bytes.

BRIEF DESCRIPTION OF THE DRAWING FIGURES

FIG. 1 is a diagram of a prior art VSA.

FIG. 2 is a diagram of an extended format VSA in accordance with the teaching of this disclosure.

DETAILED DESCRIPTION

Figure 3:
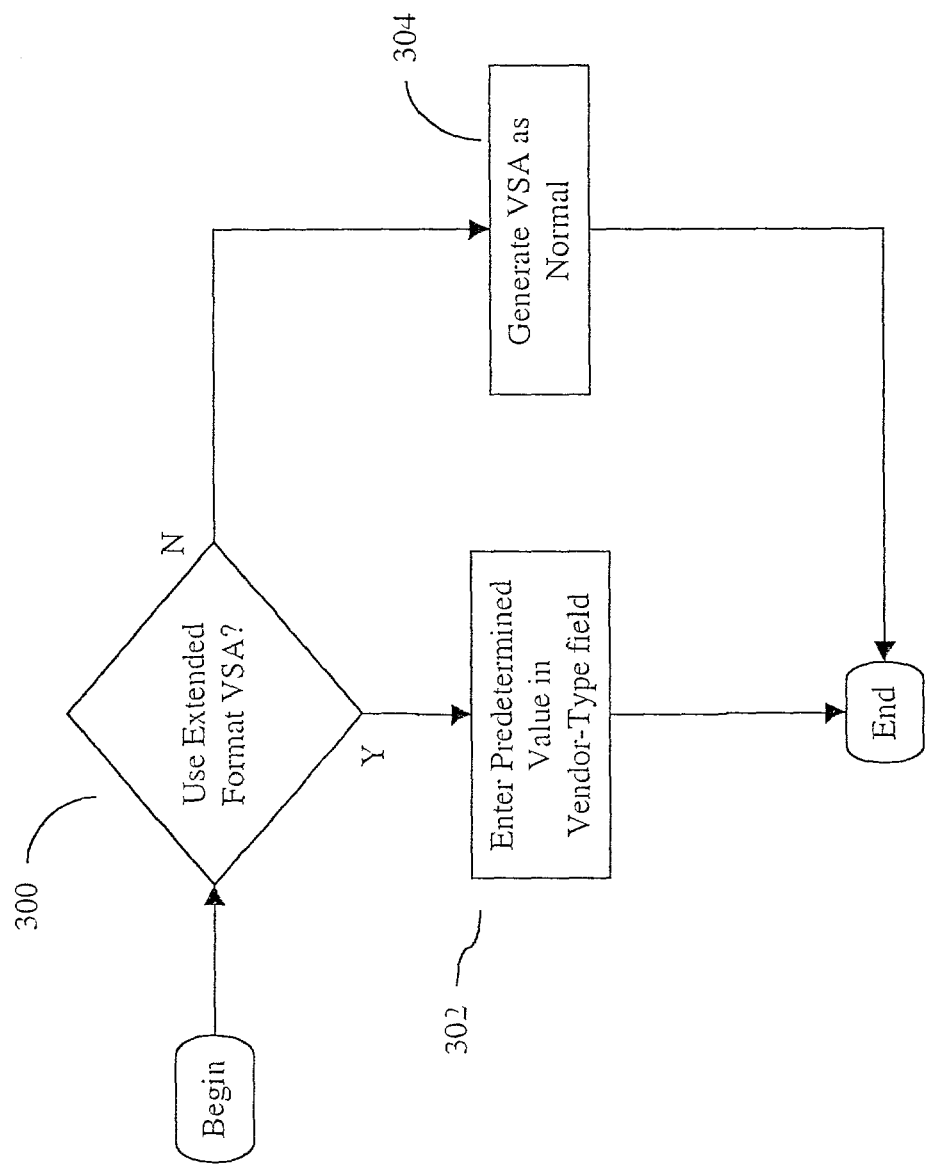
FIG. 3 is a flow diagram of a method for generating an extended format VSA in accordance with this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

This disclosure introduces a new Vendor Specific Attribute (VSA). In a one aspect, the fields of a VSA configured in accordance with the teachings of this disclosure may have the following fields with lengths as follows:

Type=8 bits
Length=8 bits
Vendor-ID=32 bits
Vendor-Type 8 bits
Length=8 bits
Vendor-Extended-Type=32 bits
Value=1 or more bytes FIG. 2 is a diagram of one aspect of a Vendor Specific Attribute (VSA) 200 configured in accordance with the teachings of this disclosure. The VSA 200 may have a field sequence of:

<Type> <Length> <Vendor-ID> <Vendor-Type> <Length> <Vendor-Extended-Type> {<Flags>+} [[<Tag>] [<Salt>] . . . ] <Value>

In the VSA of this disclosure, a single Vendor-Type field value is reserved to indicate that the attribute contains the extended format. The actual expanded field may follow the inner length field as shown in FIG. 2. Thus, when the Vendor-Type field contains a predetermined value, the VSA contains an extended format. When the Vendor-Type field does not contain a predetermined value, the VSA does not contain the extended format.

As will be appreciated by those skilled in the art, when the VSA contains the extended format, the capacity of the VSA is increased from 8-bits to 32-bits, or from 256 Vendor Types to approximately 4G Vendor Types, a great increase in capacity. The length of the actual value portion may be further reduced by 4 bytes.

Ensuring backwards capability can be important where the request and response must pass through proxy chains formed by broker networks. In these situations, proxy chains may be made aware of extensions independent of the upstream or downstream proxies to which it is connected. This can be significant in environments such as Voice over Internet Protocol (VoIP), Wholesale Service Providers and Wireless Networks.

FIG. 3 is a flowchart of a method for generating a VSA in accordance with the teachings of this disclosure. The process of FIG. 3 may begin in query 300, where it is determined whether it is desired to use the extended format VSA. If it is so desired, a predetermined value is placed in the Vendor-Type field in act 302. The Vendor Extended Type field may then be used as desired.

If it is not desired to use the extended format, then a Vendor-Type value other than the predetermined value may be used, and the VSA may be used as normal in act 304.

Figure 4:
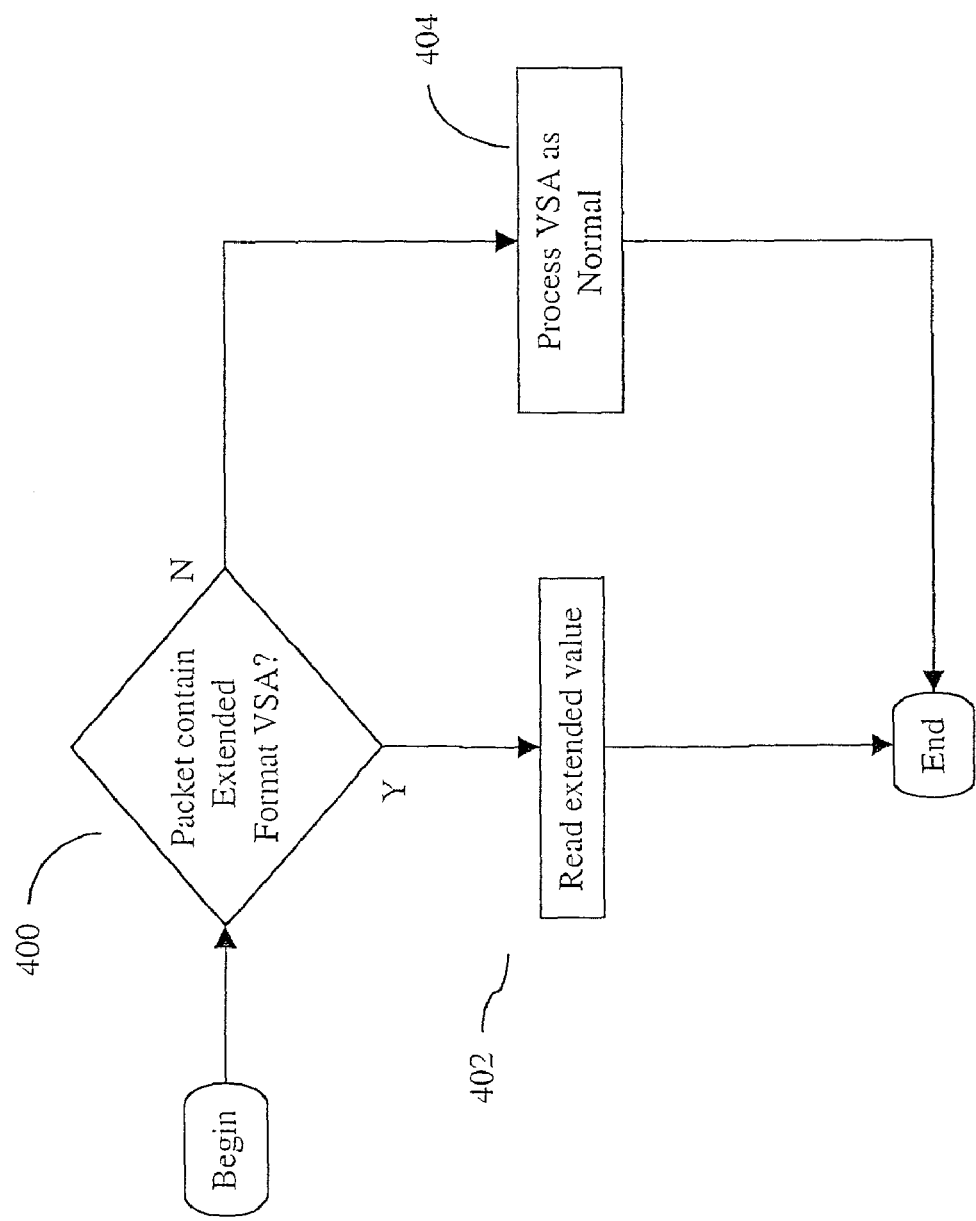
FIG. 4 is a flow diagram of a method for receiving an extended format VSA in accordance with this disclosure.

FIG. 4 is a flowchart of a method for receiving and processing a VSA in accordance with the teachings of this disclosure. The process of FIG. 4 may begin in act 400 where the receiving machine determines whether a received packet contains a Vendor-Extended-Type field according to this disclosure. If the received packet contains a Vendor-Extended-Type field, the extended value contained therein may be read by the receiving machine in act 402. If the received packet does not contain a Vendor-Extended-Type field, the packet may be processed as normal by the receiving machine in act 404.

The receiving machine may look for a predetermined value in the Vendor Type field to determined whether the received packet contains a Vendor-Extended-Type field.

Figure 5:
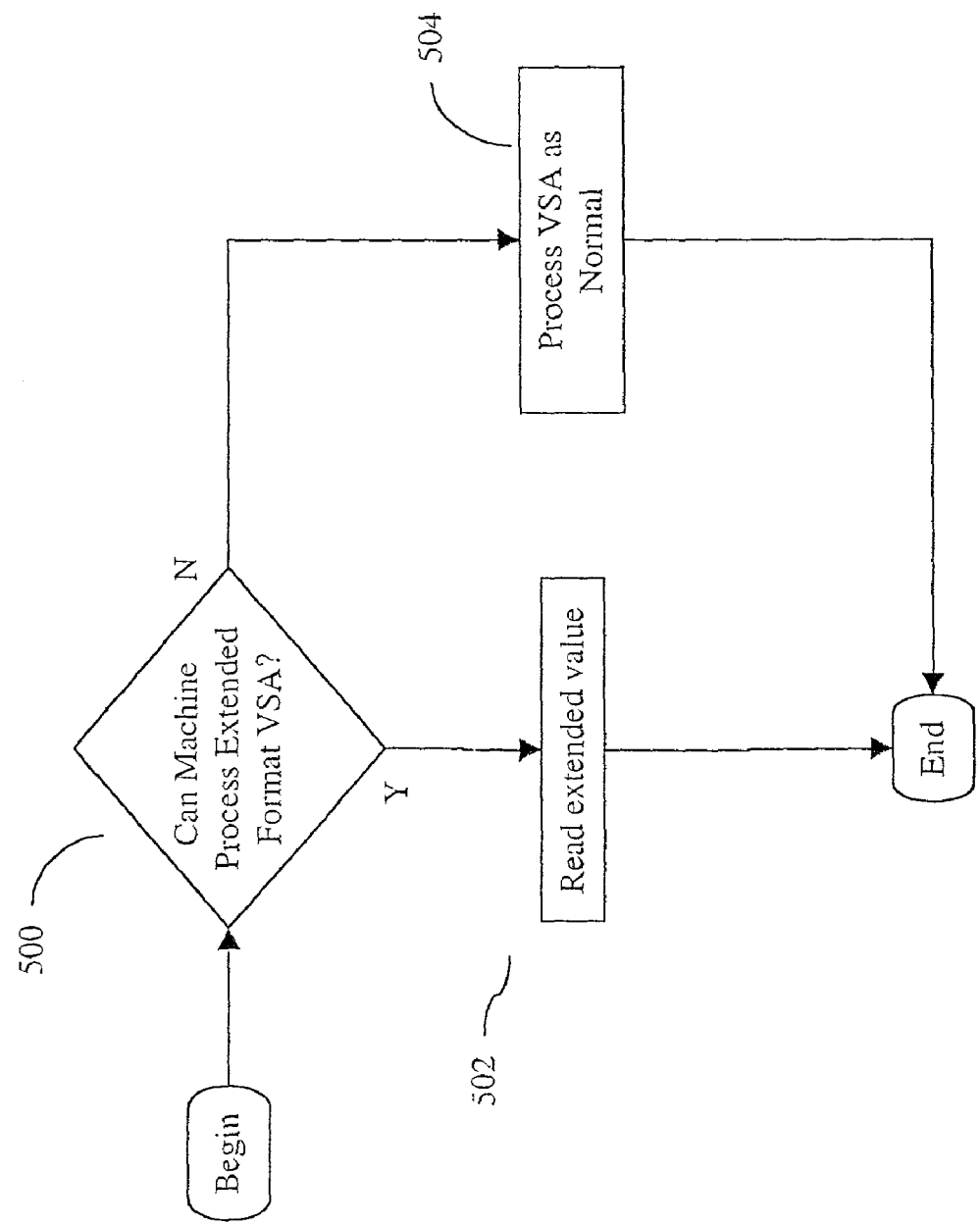
FIG. 5 is a flow diagram of a further method for receiving an extended format VSA in accordance with this disclosure.

FIG. 5 is a flowchart of a further method for receiving and processing a VSA in accordance with the teachings of this disclosure. The process of FIG. 5 may begin in act 500 where the receiving machine determines whether it is capable of processing a Vendor-Extended-Type field according to this disclosure. If the receiving machine can process a Vendor-Extended-Type field, the extended value contained therein (if present) may be read by the receiving machine in act 502. If the receiving machine is not capable of processing a Vendor-Extended-Type field, the packet may be processed as normal by the receiving machine in act 504.

It is contemplated that the processes described herein may be performed by a wide variety of machines. For example, it is contemplated that any RADIUS server may be configured to generate or process the VSA of this disclosure. Such a server may include a processor and memory as is known in the art. For example, embodiments of the present disclosure may be run wherever the RADIUS client is run, or on proxies.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for generating an extended-format Vendor Specific Attribute (VSA) packet comprising:
   a RADIUS-compliant server for generating a VSA packet including a Vendor-Type field; and
   wherein said VSA packet includes a Vendor-Extended-Type field if said Vendor-Type field contains a predetermined value wherein said Vendor extended type field is a designated portion of said packet for identifying a Vendor-Type wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits.

2. A method for generating an extended Vendor Specific Attribute (VSA) comprising:
   determining whether an extended format VSA is desired;
   if an extended format VSA is desired, then generating an extended format VSA containing a Vendor-Type field having a predetermined value indicating said VSA includes a Vendor-Extended-Type field in said VSA and a Vendor-Extended-Type field wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits.

3. A program storage device readable by a machine, tangibly embodying a program of instructions executable by the machine to perform a method for generating an extended Vendor Specific Attribute (VSA) comprising:
   determining whether an extended format VSA is desired;
   if an extended format VSA is desired, then generating an extended format VSA containing at least a Vendor-Type field having a predetermined value indicating said VSA includes a Vendor-Extended-Type field elsewhere in said VSA and said Vendor-Extended-Type field wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits.

4. A method for receiving an extended Vendor Specific Attribute (VSA) comprising:
   reading a Vendor Type field from said VSA;
   determining whether said VSA Type field includes a predetermined value;
   determining a received packet contains an extended format VSA responsive to a determination that said VSA type field includes said predetermined value;
   if said received packet contains an extended format VSA, then reading an extended value contained in a Vendor-Extended-Type field wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits; and
   if said received packet does not contain an extended format VSA, then processing said received packet as normal.

5. An apparatus for receiving an extended Vendor Specific Attribute (VSA) comprising:
- means for reading a Vendor Type field from said VSA;
- means for determining whether said VSA Type field includes a predetermined value;
- means for determining a received packet contains an extended format VSA responsive to a determination that said VSA type field includes said predetermined value;
- means for reading an extended value contained in a Vendor-Extended-Type field if said received packet contains an extended format VSA wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits; and
- means for processing said received packet as normal if said received packet does not contain an extended format VSA.

6. An apparatus for receiving an extended Vendor Specific Attribute (VSA) by a machine comprising:
- means for determining whether the machine is capable of receiving a VSA packet containing an extended format VSA;
- means for reading an extended value contained in a Vendor-Extended-Type field if said machine is capable of receiving a VSA packet containing an extended format VSA wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits; and
- means for processing said received packet as normal if said machine is not capable of receiving a packet containing an extended format VSA.

7. A program storage device readable by a machine, tangibly embodying a program of instructions executable by the machine to perform a method for receiving an extended Vendor Specific Attribute (VSA) comprising:
- reading a Vendor Type field from said VSA;
- determining whether said VSA Type field includes a predetermined value;
- determining a received packet contains an extended format VSA responsive to a determination that said VSA type field includes said predetermined value wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits;
- if said received packet contains an extended format VSA, then reading an extended value contained in a Vendor-Extended-Type field; and
- if said received packet does not contain an extended format VSA, then processing said received packet as normal.

8. A program storage device readable by a machine, tangibly embodying a program of instructions executable by the machine to perform a method for receiving an extended Vendor Specific Attribute (VSA) by a machine comprising:
- determining whether the machine is capable of receiving a packet containing an extended format VSA by examining said received packet to determine whether a Vendor-Type field contains a predetermined value;
- if said machine is capable of receiving a packet containing an extended format VSA, then reading an extended value contained in a Vendor-Extended-Type field wherein said VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits; and
- if said machine is not capable of receiving a packet containing an extended format VSA, then processing said received packet as normal.

9. An apparatus for generating an extended Vendor Specific Attribute (VSA) comprising:
- means for determining whether an extended format VSA is desired;
- means for generating an extended format VSA packet containing at least a Vendor-Type field having a predetermined value and a Vendor-Extended-Type field if an extended format VSA is desired wherein said extended format VSA packet has a field sequence of a Type field having 8 bits followed by a Length field having 8 bits followed by a Vendor-identification field having 32 bits followed by a Vendor-Type field having 8 bits followed by an Internal Length field having 8 bits which is followed by said Vendor-Extended-Type field having 32 bits.

* * * * *